US012522006B2

(12) United States Patent
Shirasaki et al.

(10) Patent No.: US 12,522,006 B2
(45) Date of Patent: Jan. 13, 2026

(54) SHEET POST-PROCESSING DEVICE AND IMAGE FORMING SYSTEM

(71) Applicant: KYOCERA Document Solutions Inc., Osaka (JP)

(72) Inventors: Seiichi Shirasaki, Osaka (JP); Yasunori Ueno, Osaka (JP); Takehiko Okada, Osaka (JP); Keisuke Egawa, Osaka (JP); Yusuke Takano, Osaka (JP); Takuya Nishimura, Osaka (JP); Terumitsu Noso, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 147 days.

(21) Appl. No.: 18/417,353

(22) Filed: Jan. 19, 2024

(65) Prior Publication Data

US 2024/0253371 A1 Aug. 1, 2024

(30) Foreign Application Priority Data

Jan. 26, 2023 (JP) ................................ 2023-010130

(51) Int. Cl.

| | |
|---|---|
| ***B41J 13/00*** | (2006.01) |
| ***B41J 11/00*** | (2006.01) |
| ***B41J 13/03*** | (2006.01) |
| ***B41J 13/10*** | (2006.01) |
| ***B65H 29/58*** | (2006.01) |
| ***B65H 31/02*** | (2006.01) |
| ***B65H 31/10*** | (2006.01) |
| ***B65H 43/08*** | (2006.01) |
| ***B65H 45/12*** | (2006.01) |
| *B65H 29/20* | (2006.01) |

(52) U.S. Cl.

CPC ....... *B41J 13/0036* (2013.01); *B41J 11/0015* (2013.01); *B41J 11/003* (2013.01); *B41J 11/0035* (2013.01); *B41J 13/0054* (2013.01); *B41J 13/03* (2013.01); *B41J 13/106* (2013.01); *B65H 29/58* (2013.01); *B65H 31/02* (2013.01); *B65H 31/10* (2013.01); *B65H 43/08* (2013.01); *B65H 45/12* (2013.01); *B65H 29/20* (2013.01); *B65H 2701/1131* (2013.01); *B65H 2801/03* (2013.01); *B65H 2801/24* (2013.01); *B65H 2801/48* (2013.01)

(58) Field of Classification Search

CPC .. B41J 13/0036; B41J 11/0015; B41J 11/003; B41J 11/0035; B41J 13/0054; B41J 13/03; B41J 13/106; B65H 31/10; B65H 31/02; B65H 29/20; B65H 29/58; B65H 43/08; B65H 45/12; B65H 2701/1131; B65H 2801/03; B65H 2801/24; B65H 2801/48

See application file for complete search history.

(56) References Cited

U.S. PATENT DOCUMENTS

2014/0061993 A1* 3/2014 Shimura ............ B65H 31/3027
270/58.09

FOREIGN PATENT DOCUMENTS

JP 2005-126245 A 5/2005

* cited by examiner

*Primary Examiner* — Henok D Legesse
(74) *Attorney, Agent, or Firm* — Stein IP, LLC

(57) ABSTRACT

When discharging a sheet onto a discharge tray, a control unit sets position of the discharge tray in an up and down direction to a predetermined discharge position. When loading the sheet onto a processing tray, the control unit sets the position of the discharge tray in the up and down direction to a loading position lower than the discharge position.

8 Claims, 13 Drawing Sheets

(when starting discharge)

(during discharging)

SHEET POST-PROCESSING DEVICE AND IMAGE FORMING SYSTEM

INCORPORATION BY REFERENCE

This application is based upon and claims the benefit of priority from the corresponding Japanese Patent Application No. 2023-010130 filed Jan. 26, 2023, the entire contents of which are hereby incorporated by reference.

BACKGROUND

The present disclosure relates to a sheet post-processing device and an image forming system.

Conventionally, there is known a sheet post-processing device that performs a stapling process or the like on sheets. The conventional sheet post-processing device is equipped with a processing tray. The processing tray loads the sheets on which the stapling process is performed. After the stapling process, the sheets are discharged from the processing tray onto a discharge tray.

SUMMARY

A sheet post-processing device according to a first aspect of the present disclosure includes a processing tray, a post-processing section, a discharge outlet, a discharge tray, a discharging member, a lifting mechanism, and a control unit. The processing tray is disposed inside a device main body, so that a sheet is loaded on the processing tray. The post-processing section performs predetermined post-processing on the sheet loaded on the processing tray. The discharge outlet is an outlet through which the sheet on the processing tray is discharged. The discharge tray is disposed movably along a side face of the device main body extending downward below the discharge outlet, so that the sheet discharged through the discharge outlet is loaded on the discharge tray. The discharging member conveys the sheet on the processing tray toward the discharge outlet, and discharges the sheet onto the discharge tray through the discharge outlet. The lifting mechanism drives the discharge tray to move in an up and down direction. The control unit controls the movement of the discharge tray in the up and down direction driven by the lifting mechanism. When discharging the sheet onto the discharge tray, the control unit sets position of the discharge tray in the up and down direction to a predetermined discharge position. When loading the sheet onto the processing tray, the control unit sets the position of the discharge tray in the up and down direction to a loading position lower than the discharge position.

An image forming system according to a second aspect of the present disclosure includes the sheet post-processing device described above and an image forming apparatus. The image forming apparatus forms an image on a sheet. The sheet post-processing device performs predetermined post-processing on the sheet after image formation by the image forming apparatus.

DETAILED DESCRIPTION

<Outline of Image Forming System>

Figure 1:
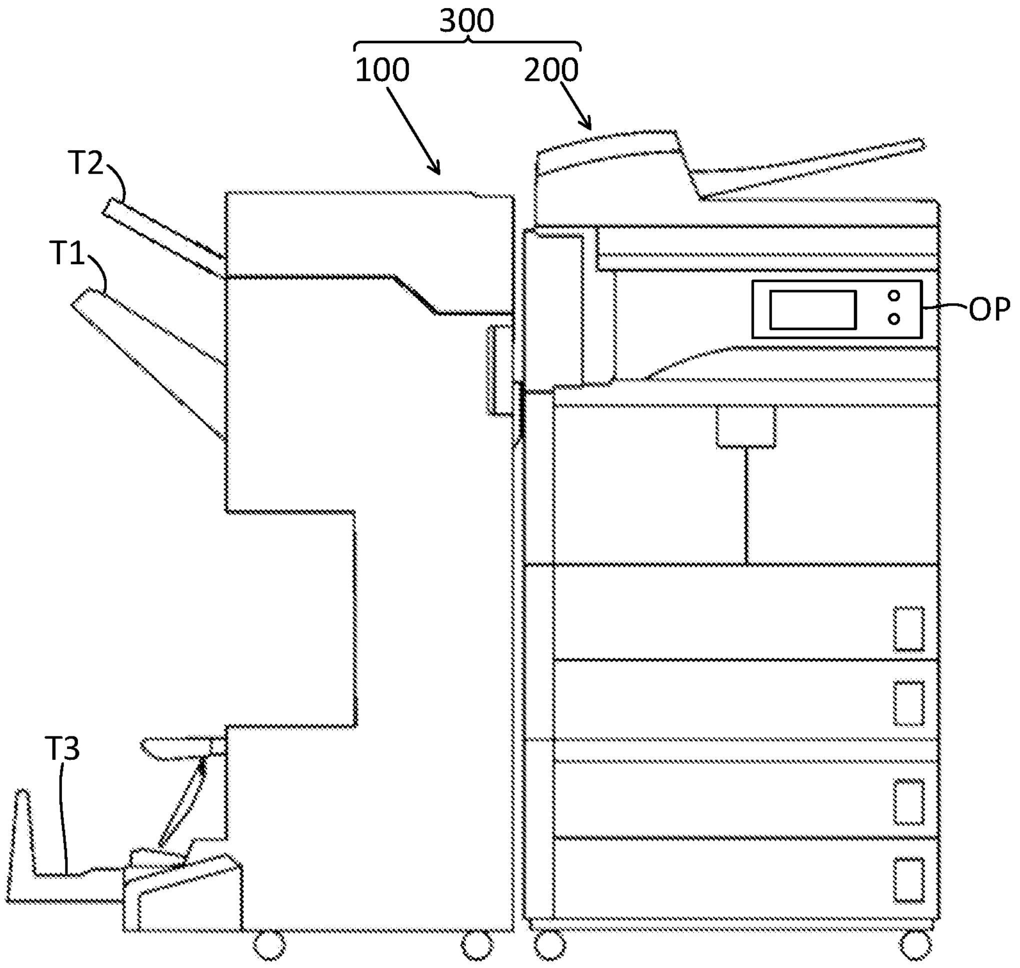
FIG. 1 is an overall view of an image forming system according to one embodiment.

A sheet post-processing device 100 of this embodiment is connected to an image forming apparatus 200 as illustrated in FIG. 1. The sheet post-processing device 100 and the image forming apparatus 200 constitute an image forming system 300. In other words, the image forming system 300 includes the sheet post-processing device 100 and the image forming apparatus 200.

The image forming apparatus 200 prints an image on a sheet S. A type of the sheet S is not particularly limited. For instance, a paper sheet is used as the sheet S. The sheet post-processing device 100 performs post-processing on the sheet S after printing.

The image forming apparatus 200 includes an image forming section (not shown). For instance, the image forming apparatus 200 is an inkjet recording apparatus. In other words, the image forming section includes a recording head that ejects ink. The image forming section ejects ink onto the sheet S so as to form an image. Note that a printing method of the image forming section is not particularly limited, and it be an electrophotographic method.

The image forming apparatus 200 includes an operation panel OP. The operation panel OP corresponds to an “input section”. The operation panel OP includes a touch screen and a hardware button. The operation panel OP accepts an input of information from a user.

The image forming apparatus 200 conveys the sheet S and forms an image on the sheet S. In addition, the image forming apparatus 200 conveys the sheet S after printing and feeds the sheet S to the sheet post-processing device 100.

The sheet post-processing device 100 receives the sheet S from the image forming apparatus 200. The sheet post-processing device 100 conveys the sheet S, and performs post-processing such as a punching process, a folding process, a stapling process, or a booklet process on the sheets S. After the post-processing, the sheet post-processing device 100 discharges the sheets S.

Note that the sheet post-processing device 100 is attachable and detachable from the image forming apparatus 200. The sheet post-processing device 100 be solely usable. In this case, the sheet post-processing device 100 includes a setting tray on which the sheets S are set. Further, the sheet post-processing device 100 carries in the sheets S set on the setting tray and performs the post-processing on the sheets S.

In the following description, the direction perpendicular to an installation surface of the sheet post-processing device 100 (e.g., a flat floor) is defined as the up and down direction.

<Structure of Sheet Post-Processing Device>

Figure 2:
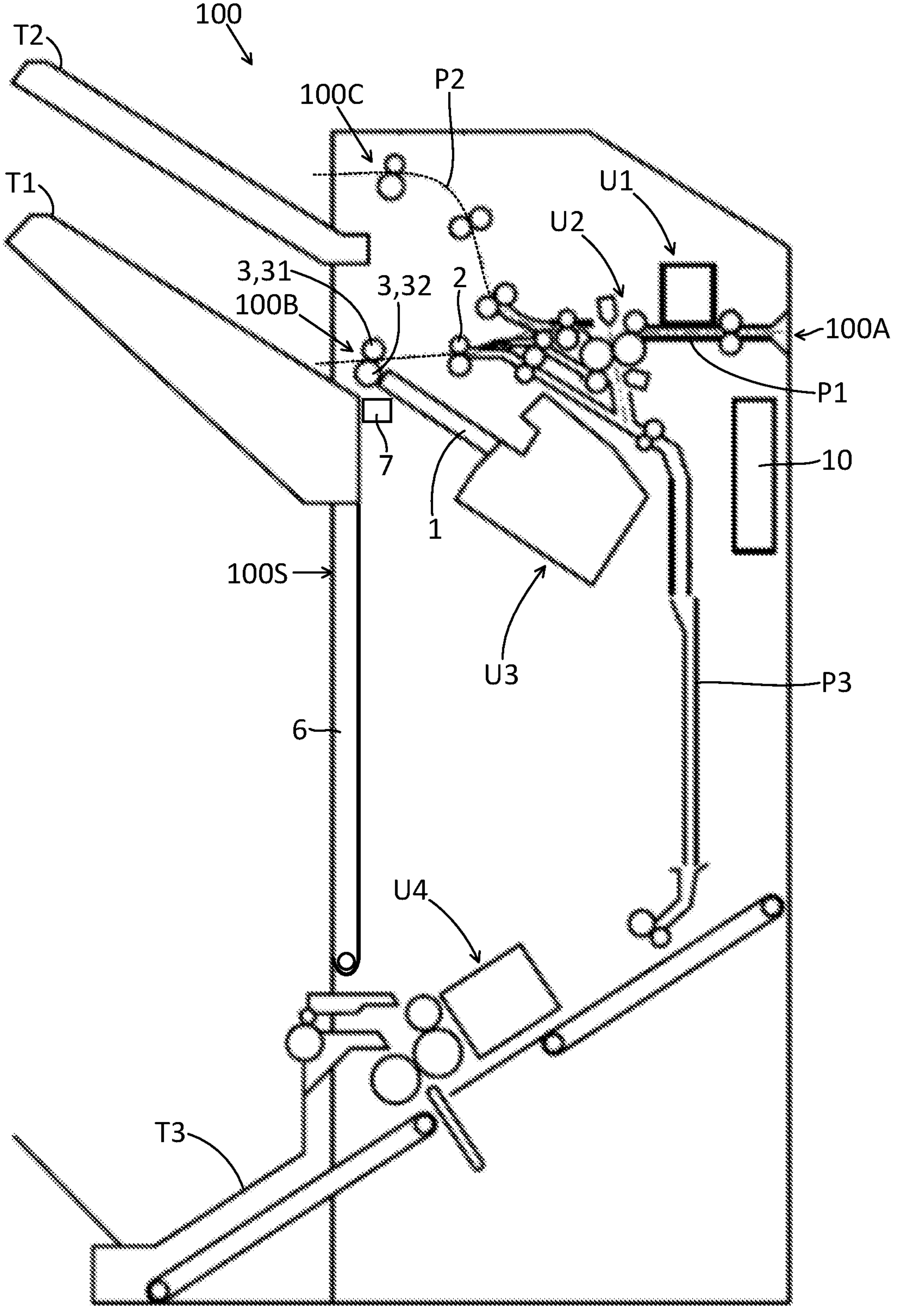
FIG. 2 is a schematic view of a sheet post-processing device according to one embodiment.

The sheet post-processing device 100 has a structure illustrated in FIG. 2. Note that FIG. 2 is a schematic view of the sheet post-processing device 100 viewed from the front. In the following description, "left" and "right" mean directions when the sheet post-processing device 100 is viewed from the front.

The sheet post-processing device 100 includes a carry-in entrance 100A of the sheet S, a main discharge outlet 100B, and a sub discharge outlet 100C. In addition, the sheet post-processing device 100 includes a main tray T1 and a sub tray T2. The main discharge outlet 100B corresponds to a "discharge outlet", and the main tray T1 corresponds to a "discharge tray".

The carry-in entrance 100A is disposed on the side of the sheet post-processing device 100, which is the side connected to the image forming apparatus 200. The sheet S is carried into the sheet post-processing device 100 from the image forming apparatus 200 through the carry-in entrance 100A. The main discharge outlet 100B and the sub discharge outlet 100C are disposed on the side of the sheet post-processing device 100, which is opposite to the side connected to the image forming apparatus 200. The sheet S is discharged to the outside of the sheet post-processing device 100 through either the main discharge outlet 100B or the sub discharge outlet 100C.

The main tray T1 and the sub tray T2 are disposed on the side of the sheet post-processing device 100, which is opposite to the side connected to the image forming apparatus 200. The sub tray T2 is disposed above the main tray T1. The sheet post-processing device 100 discharges the sheets S onto the main tray T1 or the sub tray T2. The main tray T1 loads the sheet S discharged from the main discharge outlet 100B, and the sub tray T2 loads the sheet S discharged from the sub discharge outlet 100C.

The sheet post-processing device 100 has a first conveying path P1 and a second conveying path P2. The first conveying path P1 and the second conveying path P2 are conveying paths for the sheet S. The first conveying path P1 extends from the carry-in entrance 100A in a substantially horizontal direction, so as to reach the main discharge outlet 100B. The second conveying path P2 branches from the first conveying path P1 in the upper left direction, so as to reach the sub discharge outlet 100C.

The sheet S is conveyed from the carry-in entrance 100A to the main tray T1 or the sub tray T2. The sheet S is conveyed from the right to the left in FIG. 2. In other words, the direction from the right to the left in FIG. 2 is a sheet conveying direction. In the following description, the direction perpendicular to the sheet conveying direction is referred to as a width direction Dw. The width direction Dw is the direction perpendicular to the up and down direction of the sheet post-processing device 100, and is the front and back direction of the sheet post-processing device 100 (the direction perpendicular to the paper of FIG. 2).

The sheet post-processing device 100 includes a punching unit U1, a folding unit U2, a stapling unit U3, and a booklet unit U4. The punching unit U1, the folding unit U2, the stapling unit U3, and the booklet unit U4 each perform the corresponding post-processing on the sheet S.

The punching unit U1 is disposed on an upstream side of the first conveying path P1 in the sheet conveying direction. The punching unit U1 performs the punching process as the post-processing to form punch holes in the sheet S. The folding unit U2 is disposed on a downstream side of the punching unit U1 in the sheet conveying direction. The folding unit U2 performs the folding process as the post-processing to fold the sheet S.

The stapling unit U3 performs the stapling process as the post-processing to staple a bunch of a plurality of the sheets S with staple needles. Hereinafter, the bunch of the plurality of sheets S be referred to simply as a bunch of sheets S. Here, the sheet post-processing device 100 includes a processing tray 1. When the stapling process is performed, the plurality of sheets S are loaded onto the processing tray 1. Then, the stapling process is performed on the plurality of sheets S on the processing tray 1.

After the stapling process, a bundle of the sheets S after stapling with the staple needles is discharged onto the main tray T1. In this structure, the stapling process corresponds to "predetermined post-processing", and the stapling unit U3 corresponds to a "post-processing section". Note that a loading process of the sheet S onto the processing tray 1 will be described later in detail.

The booklet unit U4 performs the booklet process as the post-processing in which the bundle of sheets S stapled in the middle is folded in the middle. The booklet unit U4 includes a stapling unit to staple in the middle, and uses the stapling unit so as to staple the bunch of sheets S in the middle with the staple needles.

For instance, the sheet post-processing device 100 includes a third conveying path P3 that branches from the first conveying path P1 to extend downward. The third conveying path P3 connects to the booklet unit U4. When the booklet process is performed, the sheets S are conveyed to the booklet unit U4 via the third conveying path P3.

In addition, the sheet post-processing device 100 includes a booklet tray T3. The booklet tray T3 is disposed on the side of the sheet post-processing device 100, which is opposite to the side connected to the image forming apparatus 200. The booklet tray T3 is disposed below the main tray T1. A booklet obtained by the booklet process is discharged onto the booklet tray T3.

Note that the sheet post-processing device 100 includes a control unit 10. The control unit 10 includes a processing circuit such as a CPU and an ASIC. In addition, the control unit 10 includes a storage device such as a ROM and a RAM. The control unit 10 controls the post-processing performed by the sheet post-processing device 100.

For instance, the control unit 10 communicates with a main control unit (not shown) that controls the image forming apparatus 200. The control unit 10 receives job information from the main control unit, the job information being about the post-processing to be performed by the sheet post-processing device 100. The job information includes, for example, information about a size of the sheet S, the number of the sheets S in the bundle, a stapling position of the sheet S, and the like.

<Structure of Conveying Roller Pair>

The sheet post-processing device 100 includes a plurality of conveying roller pairs as illustrated in FIG. 2. The plurality of conveying roller pairs each include a pair of rollers that are pressed to contact each other. The plurality of conveying roller pairs each nip the sheet S between the pair of rollers and rotate, so as to convey the sheet S.

Here, the sheet post-processing device 100 includes an intermediate roller pair 2 as one of the conveying roller pairs, which is disposed in the first conveying path P1. The intermediate roller pair 2 is disposed on the downstream side of the folding unit U2 in the sheet conveying direction. The intermediate roller pair 2 conveys the sheet S to the main discharge outlet 100B, and allows a front end Sf of the sheet S to protrude above the main tray T1 via the main discharge outlet 100B.

In addition, the sheet post-processing device 100 includes a discharge roller pair 3 as one of the conveying roller pairs, which is disposed in the first conveying path P1. The discharge roller pair 3 is disposed on the downstream side of the intermediate roller pair 2 in the sheet conveying direction. Specifically, the discharge roller pair 3 is disposed in the main discharge outlet 100B. The discharge roller pair 3 nips the sheet S (including the bunch of sheets S) at the main discharge outlet 100B, and discharges the sheet S onto the main tray T. The discharge roller pair 3 corresponds to a "discharging member".

The discharge roller pair 3 includes an upper roller 31 and a lower roller 32. The upper roller 31 is disposed on the upside of a conveying path of the sheet S, and the lower roller 32 is disposed on the downside of the conveying path of the sheet S. The upper roller 31 and the lower roller 32 are pressed to contact each other via the conveying path of the sheet S. The discharge roller pair 3 nips the sheet S between the upper roller 31 and the lower roller 32 and rotates. In this way, the sheet S is discharged from the main discharge outlet 100B onto the main tray T1.

The upper roller 31 is supported at one end of a roller arm (not shown). The roller arm is rotatable about a rotation shaft at the other end thereof, so as to swing the one end in the up and down direction. In this way, the upper roller 31 can be separated from the lower roller 32. In addition, the upper roller 31 can be pressed to contact with the lower roller 32. When discharging the sheet S onto the main tray T1, the upper roller 31 and the lower roller 32 are pressed to contact each other via the sheet S.

<Structure of Processing Tray>

Figure 3:
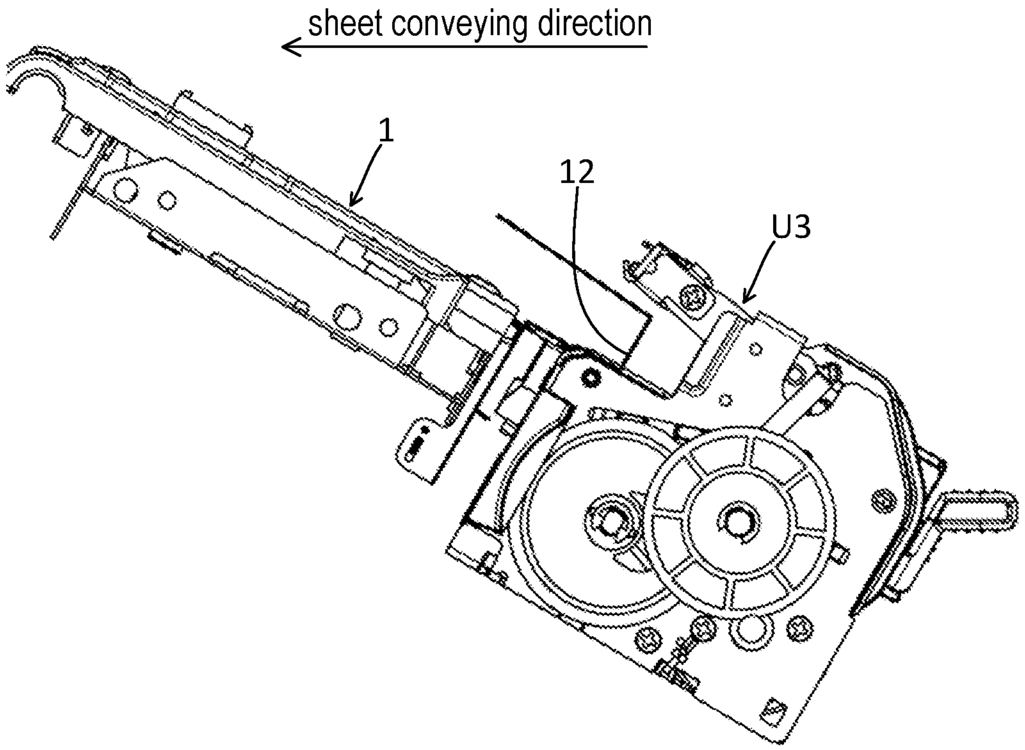
FIG. 3 is a side view of a processing tray and its vicinity of the sheet post-processing device according to one embodiment.

As illustrated in FIGS. 2 and 3, the processing tray 1 is disposed at a processing position, and is inclined downward from the downstream side to the upstream side in the sheet conveying direction. The position of the processing tray 1 illustrated in FIG. 2 is the processing position. The processing tray 1 is inclined downward from one end side to the other end side. Viewed from the front of the sheet post-processing device 100 (viewed in the front and back direction), the left end of the processing tray 1 is the one end, and the right end of the processing tray 1 is the other end. In other words, the processing tray 1 is inclined downward from the left to the right viewed from the front of the sheet post-processing device 100.

The one end of the processing tray 1 is disposed at the main discharge outlet 100B. In other words, the processing tray 1 is inclined downward from the main discharge outlet 100B to the upstream side in the sheet conveying direction. The lower roller 32 is disposed at the one end of the processing tray 1.

The stapling unit U3 is disposed at the other end of the processing tray 1. When the stapling process is performed, the plurality of sheets S are loaded on the processing tray 1. The stapling unit U3 performs the stapling process on the plurality of sheets S on the processing tray 1.

Figure 4:
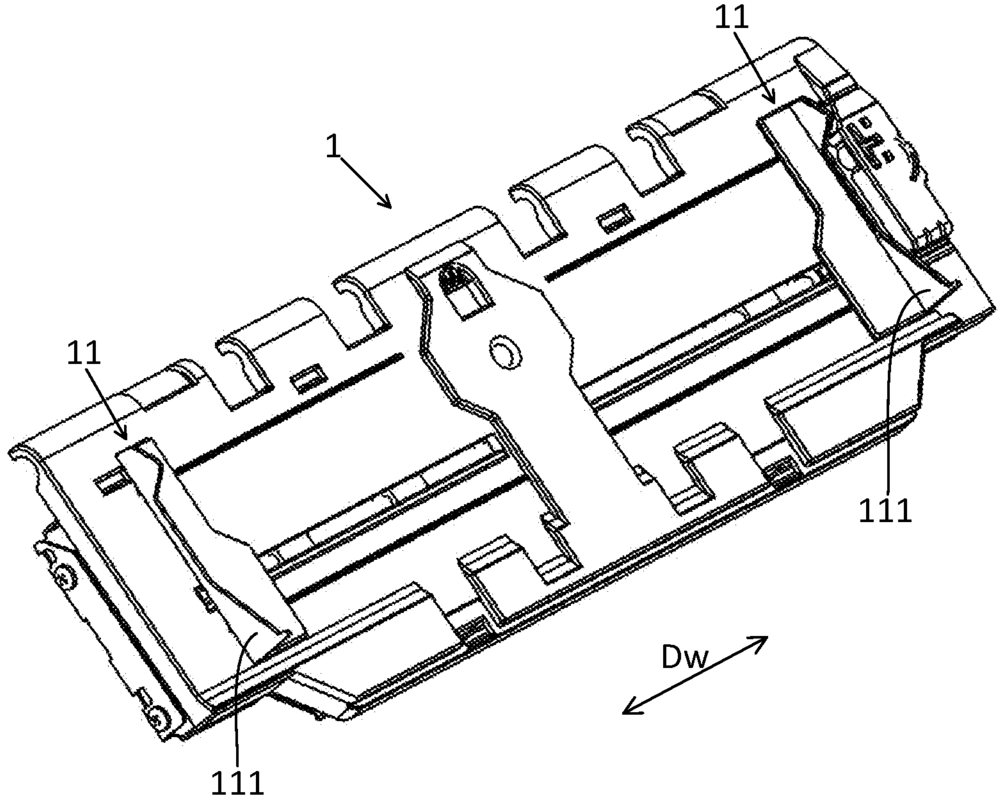
FIG. 4 is a perspective view of the processing tray of the sheet post-processing device according to one embodiment.

The processing tray 1 has a structure as illustrated in FIG. 4. The processing tray 1 is provided with a pair of processing tray cursors 11. In other words, the sheet post-processing device 100 includes the pair of processing tray cursors 11.

The pair of processing tray cursors 11 include a cursor disposed on one side and a cursor disposed on the other side with respect to the center of the processing tray 1 in the width direction Dw. In other words, the pair of processing tray cursors 11 are disposed with a space therebetween in the width direction Dw. In addition, the pair of processing tray cursors 11 each have a side wall 111. The pair of side walls 111 face each other in the width direction Dw.

The pair of processing tray cursors 11 are configured to be movable in a reciprocation manner in the width direction Dw independently of each other on the processing tray 1. Specifically, the processing tray 1 has a pair of drive mechanisms (not shown) connected to the pair of processing tray cursors 11, respectively. The structure of the pair of drive mechanisms is not particularly limited. For instance, the pair of drive mechanisms each includes a processing tray motor, a plurality of pulleys including a drive pulley rotated by a drive force of the processing tray motor, and an endless belt stretched around the plurality of pulleys. The pair of processing tray cursors 11 are connected to the belts of the corresponding drive mechanisms, respectively. Note that the control unit 10 controls the processing tray motor.

The pair of processing tray cursors 11 are each controlled by the processing tray motor of the corresponding drive mechanism, so as to move in the width direction Dw on the processing tray 1. Further, the pair of processing tray cursors 11 sandwich the sheets S in the width direction Dw on the processing tray 1. In this way, the sheets S are aligned in the width direction Dw on the processing tray 1.

A reference plate 12 (see FIG. 3) is disposed on the other end of the processing tray 1. A rear end Sr of the sheet S loaded onto the processing tray 1 abuts the reference plate 12. When the rear end Sr of the sheet S abuts the reference plate 12, the rear end position of the sheet S is aligned.

<Loading of Sheets onto Processing Tray>

Figure 5:
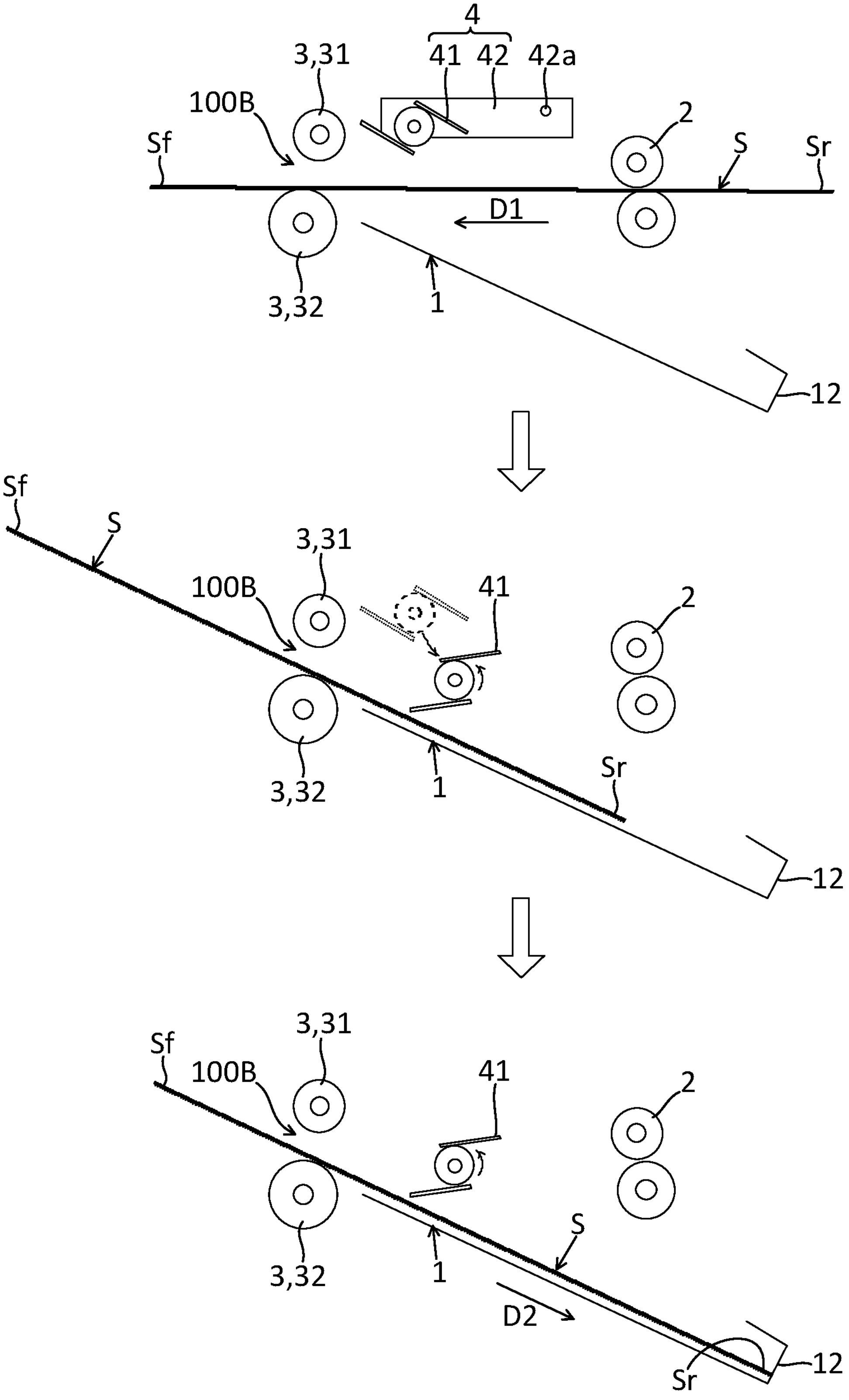
FIG. 5 is a diagram illustrating a flow when a sheet is loaded onto the processing tray of the sheet post-processing device according to one embodiment.

The sheet post-processing device 100 includes a pull-in member 4 as illustrated in FIG. 5. When performing the stapling process on the sheets S, i.e., when loading the sheet S onto the processing tray 1, the pull-in member 4 pulls in the sheet S to the processing position. When the sheet S is not loaded onto the processing tray 1, the pull-in member 4 does not pull in the sheet S to the processing position. The pull-in member 4 includes a paddle 41 and a paddle holder 42.

The paddle 41 is disposed above the processing tray 1. The paddle 41 includes a pair of rubber sheets. The pair of rubber sheets protrude in tangential directions (to upstream sides in the rotation direction) from point-symmetric positions on an outer periphery of a rotation shaft extending in the width direction Dw. The paddle 41 is rotated by a drive force transmitted from a not-shown motor. In FIG. 5, the paddle 41 rotates in a counterclockwise direction.

The paddle holder 42 supports the paddle 41 in a rotatable manner at one end thereof. In addition, the paddle holder 42 has a swing shaft 42*a* at the other end thereof. The paddle holder 42 can swing about the swing shaft 42*a* as a fulcrum so that the one end supporting the paddle 41 is swung in the up and down direction. The paddle holder 42 is swung by a drive force transmitted from a not-shown motor.

After the rear end Sr of the sheet S conveyed by the intermediate roller pair 2 passes the intermediate roller pair 2, the front end Sf of the sheet S protrudes from the main discharge outlet 100B above the main tray T1, and in this state the pull-in member 4 switches back the sheet S so as to pull in the sheet S to the processing position. When the pull-in member 4 pulls in the sheet S, the rear end Sr of the sheet S abuts the reference plate 12. In other words, the pull-in member 4 pulls in the sheet S so as to load the sheet S onto the processing tray 1.

Hereinafter, with reference to FIG. 5, the loading process of the sheet S onto the processing tray 1 is described in detail. In FIG. 5, the sheet S is illustrated by a thick line.

First, as illustrated in the upper part of FIG. 5, the paddle 41 is retained at a retreat position not contacting with the sheet S (the position illustrated in the upper part of FIG. 5). In addition, the nip of the discharge roller pair 3 (the state of the upper roller 31 pressed to contact with the lower roller 32) is released. In this state, the sheet S is conveyed by the intermediate roller pair 2. In this way, the front end Sf of the sheet S that is being conveyed by the intermediate roller pair 2 protrudes from the main discharge outlet 100B above the main tray T1. In the upper part of FIG. 5, the sheet conveying direction of the intermediate roller pair 2 is illustrated by an arrow D1.

Further, as illustrated in the middle part of FIG. 5, when the rear end Sr of the sheet S that is being conveyed by the intermediate roller pair 2 passes the intermediate roller pair 2, the paddle 41 moves toward the processing tray 1, and the paddle 41 contacts with the sheet S so that the sheet S becomes along the top surface of the processing tray 1. Further, the paddle 41 rotates while contacting with the sheet S. Note that it be possible to tap the sheet S toward the processing tray 1 using a not-shown tapping member, when the rear end Sr of the sheet S that is being conveyed by the intermediate roller pair 2 passes the intermediate roller pair 2.

When the paddle 41 rotates while contacting with the sheet S, the sheet S is moved along the top surface of the processing tray 1 toward the reference plate 12 as illustrated in the lower part of FIG. 5. In other words, the sheet S slips down along the top surface of the processing tray 1. In still other words, the sheet S is switched back. As a result, the rear end Sr of the sheet S abuts the reference plate 12. In the lower part of FIG. 5, the moving direction of the sheet S is illustrated by an arrow D2.

After that, the paddle 41 moves to the retreat position. Further, the same operation is repeated until the number of the sheets S loaded onto the processing tray 1 reaches a set number.

When the number of the sheets S loaded onto the processing tray 1 reaches the set number, the bunch of sheets S on the processing tray 1 are sandwiched by the pair of processing tray cursors 11 in the width direction Dw, and in this state the stapling process is performed. After that, the discharge roller pair 3 conveys the sheets S on the processing tray 1 to the main discharge outlet 100B, and discharges the sheets S onto the main tray T1 via the main discharge outlet 100B. In other words, the bundle of sheets S on the processing tray 1 is nipped by the discharge roller pair 3 and is discharged onto the main tray T1.

Figure 6:
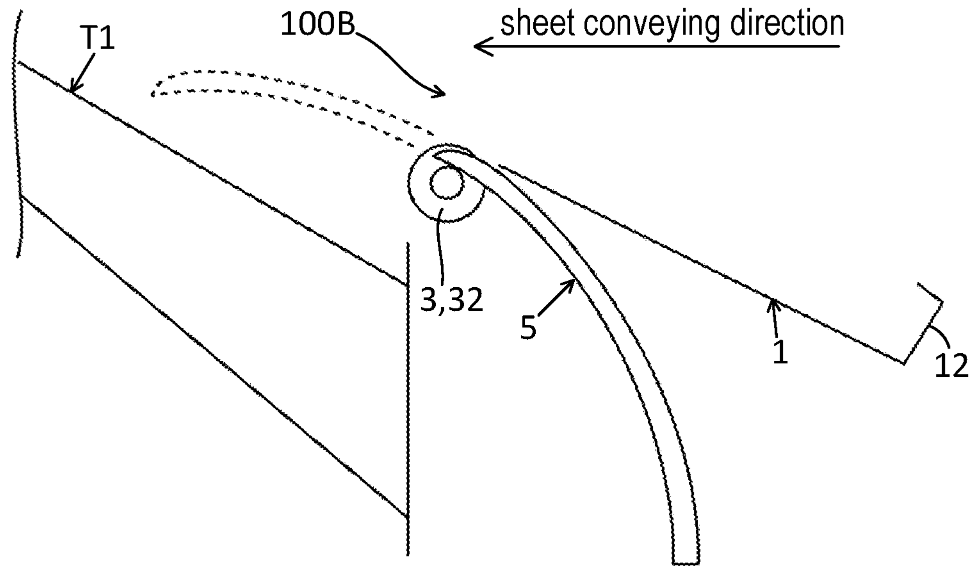
FIG. 6 is a schematic diagram of a support member of the sheet post-processing device according to one embodiment.

For instance, the sheet post-processing device 100 includes a support member 5 as illustrated in FIG. 6. The support member 5 is disposed below the processing tray 1. The support member 5 is a rod-like member and is formed in an arc shape. The support member 5 is movable between a retreat position to retreat to the upstream side of the lower roller 32 in the sheet conveying direction (the position indicated by a solid line in FIG. 6), and a protruding position to protrude to the downstream side of the lower roller 32 in the sheet conveying direction (the position indicated by a broken line in FIG. 6).

When the sheet S is loaded onto the processing tray 1, the support member 5 is positioned at the protruding position. In this way, the front end Sf of the sheet S protruding from the main discharge outlet 100B above the main tray T1 is supported by the support member 5.

<Discharge of Sheet onto Main Tray>

When discharging the sheet S onto the main tray T1, the discharge roller pair 3 nips the sheet S at the main discharge outlet 100B, and conveys the sheet S toward the main tray T1. In other words, when discharging the sheet S onto the main tray T1, the upper roller 31 is pressed to contact with the lower roller 32. In this state the discharge roller pair 3 rotates, and the sheet S is discharged onto the main tray T1.

When the stapling process is performed on the sheets S, i.e., when the sheets S are loaded onto the processing tray 1, after the stapling process, the discharge roller pair 3 nips the sheets S on the processing tray 1 at the main discharge outlet 100B and rotates. In this way, the sheets S are discharged from the processing tray 1 onto the main tray T1. If the stapling process is not performed on the sheet S, the sheet S is discharged onto the main tray T1 without being loaded onto the processing tray 1.

Here, as illustrated in FIG. 2, the sheet post-processing device 100 includes a lifting mechanism 6. The lifting mechanism 6 moves the main tray T1 in the up and down direction. In other words, the main tray T1 can move along a side face 100S of a device main body of the sheet post-processing device 100 extending downward below the main discharge outlet 100B.

The lifting mechanism 6 includes a lifting belt, a pair of pulleys around which the lifting belt is wrapped, and a lifting motor that rotates a drive pulley of the pair of pulleys. The pair of pulleys of the lifting mechanism 6 are disposed with an interval therebetween in the up and down direction. The main tray T1 is connected to the lifting belt. In this structure, when the lifting motor rotates the drive pulley, the lifting belt is driven. In this way, the main tray T1 can be moved in the up and down direction. Note that the control unit 10 controls the lifting motor.

In addition, the sheet post-processing device 100 includes a top surface detection unit 7. The top surface detection unit 7 is connected to the control unit 10. The control unit 10 controls movement of the main tray T1 in the up and down direction driven by the lifting mechanism 6, on the basis of an output of the top surface detection unit 7.

Figure 7:
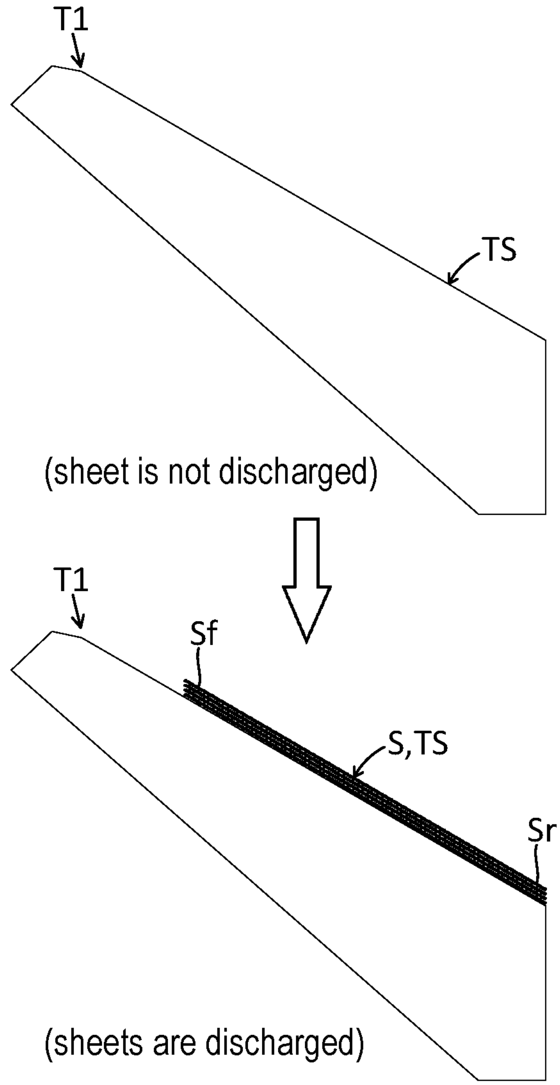
FIG. 7 is a diagram illustrating a target surface of top surface detection performed by the sheet post-processing device according to one embodiment.

The top surface detection unit 7 detects a top surface of the main tray T1 or a top surface of the sheet S discharged on the main tray T1. Specifically, the top surface detection unit 7 recognizes the top surface of the main tray T1 or the top surface of the sheet S discharged on the main tray T1 as a target surface TS (see FIG. 7). Further, the top surface detection unit 7 detects the position of the target surface TS in the up and down direction. As illustrated in the upper part of FIG. 7, when the sheet S is not yet discharged on the main tray T1, the top surface of the main tray T1 is the target surface TS. As illustrated in the lower part of FIG. 7, when the sheet S is already discharged on the main tray T1, the top surface of the sheet S discharged on the main tray T1 is the target surface TS. If there are a plurality of the sheets S on the main tray T1, the top surface of the top sheet S is the target surface TS. The top surface detection unit 7 detects that there is the target surface TS at a predetermined discharge position below the main discharge outlet 100B.

For instance, the top surface detection unit 7 includes an actuator disposed at the discharge position and a transmission type optical sensor (i.e., a light emitting element and a light receiving element) that detects the actuator, and the like. When the main tray T1 moves upward and the target surface TS reaches the discharge position, the actuator is pressed upward and blocks (or opens) an optical path of the optical sensor. From this state, when the main tray T1 moves downward, the actuator is released from being pressed and moves back to its original position, and hence the optical path of the optical sensor is opened (or blocked).

In this way, the optical sensor of the top surface detection unit 7 changes its output depending on presence or absence of the target surface TS at the discharge position. When the main tray T1 moves upward and the target surface TS reaches the discharge position, the top surface detection unit 7 outputs a top surface detection signal, which indicates that the target surface TS is detected. In other words, when the main tray T1 moves upward and the target surface TS reaches the discharge position, an output level of the top surface detection unit 7 changes to a predetermined level.

On the basis of the output of the top surface detection unit 7, the control unit 10 detects whether or not the target surface TS has reached the discharge position. When the top surface detection unit 7 outputs the top surface detection signal (i.e., when the output level of the top surface detection unit 7 changes to the predetermined level), the control unit 10 detects that the target surface TS has reached the discharge position.

For instance, when the image forming apparatus 200 starts a print job, the control unit 10 controls the main tray T1 to move downward from the current position. After that, the control unit 10 controls the main tray T1 to move upward until the top surface detection unit 7 outputs the top surface detection signal. In this way, in the state where the position of the target surface TS in the up and down direction is maintained at the discharge position, the image forming apparatus 200 starts the print job.

After the print job is started, the control unit 10 counts the number of discharged sheets S discharged onto the main tray T1. When a bundle of sheets S is discharged onto the main tray T1, the number of sheets S in the bundle is counted as the number of discharged sheets.

Further, when the number of discharged sheets exceeds a predetermined number, the control unit 10 controls the main tray T1 to move downward from the current position by a predetermined amount. In this way, the target surface TS (i.e., the top surface of the top sheet S on the main tray T1) moves downward from the discharge position. In this case, the sheet S on the main tray T1 slips down along the top surface of the main tray T1, and hence the rear end Sr of the sheet S reaches below the actuator of the top surface detection unit 7 (i.e., a position that can contact with the actuator). After that, the control unit 10 controls the main tray T1 to move upward until the top surface detection unit 7 outputs the top surface detection signal. In this way, the position of the top surface of the top sheet S on the main tray T1 (i.e., the target surface TS) in the up and down direction is maintained at the discharge position.

<Position Control of Target Surface when Loading Sheet on Processing Tray>

Hereinafter, position control of the main tray T1 in the up and down direction when loading the sheet S on the processing tray 1 is described. In the following description, it is supposed that two sheets S are being loaded on the processing tray 1, for convenience sake. If it is necessary to discriminate the two sheets S, the sheet S that is first loaded on the processing tray 1 is referred to as a preceding sheet S1, and the sheet S that is loaded next on the processing tray 1 is referred to as a following sheet S2.

Figure 8:
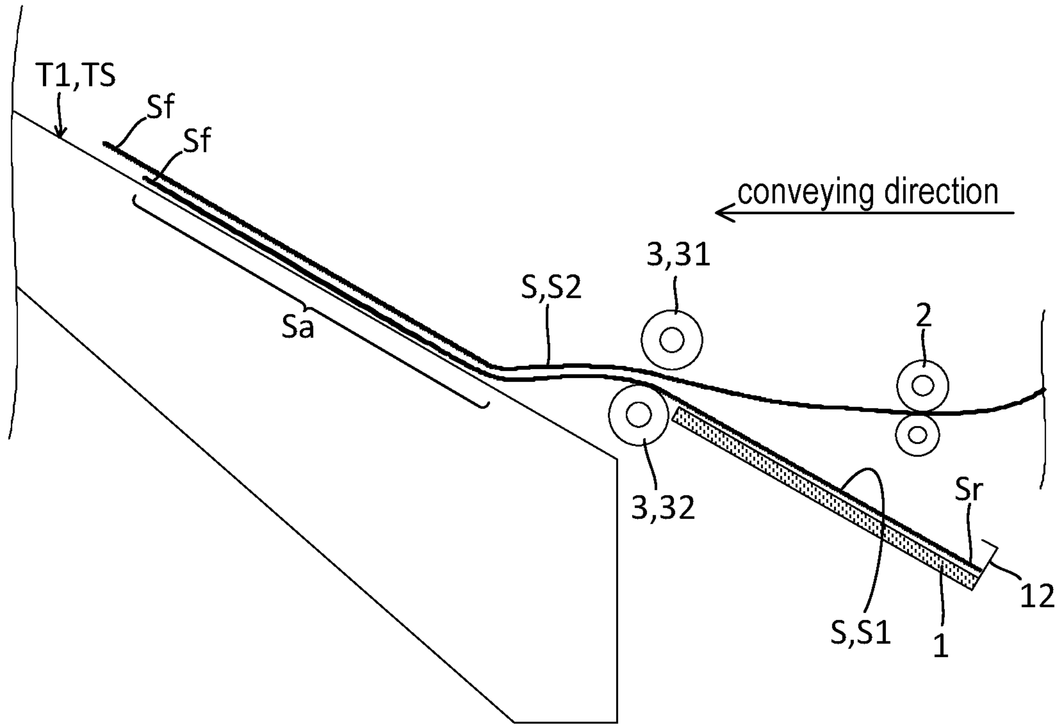
FIG. 8 is a diagram for explaining a disadvantage caused by loading the sheet onto the processing tray.
Figure 9:
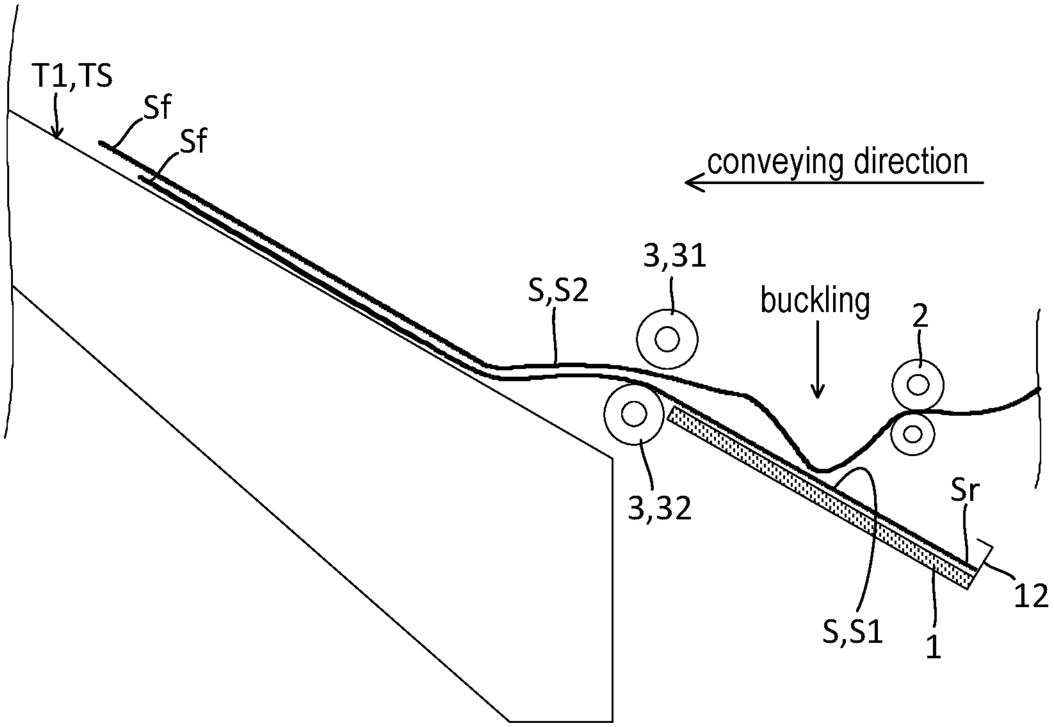
FIG. 9 is a diagram for explaining a disadvantage caused by loading the sheet onto the processing tray.
Figure 10:
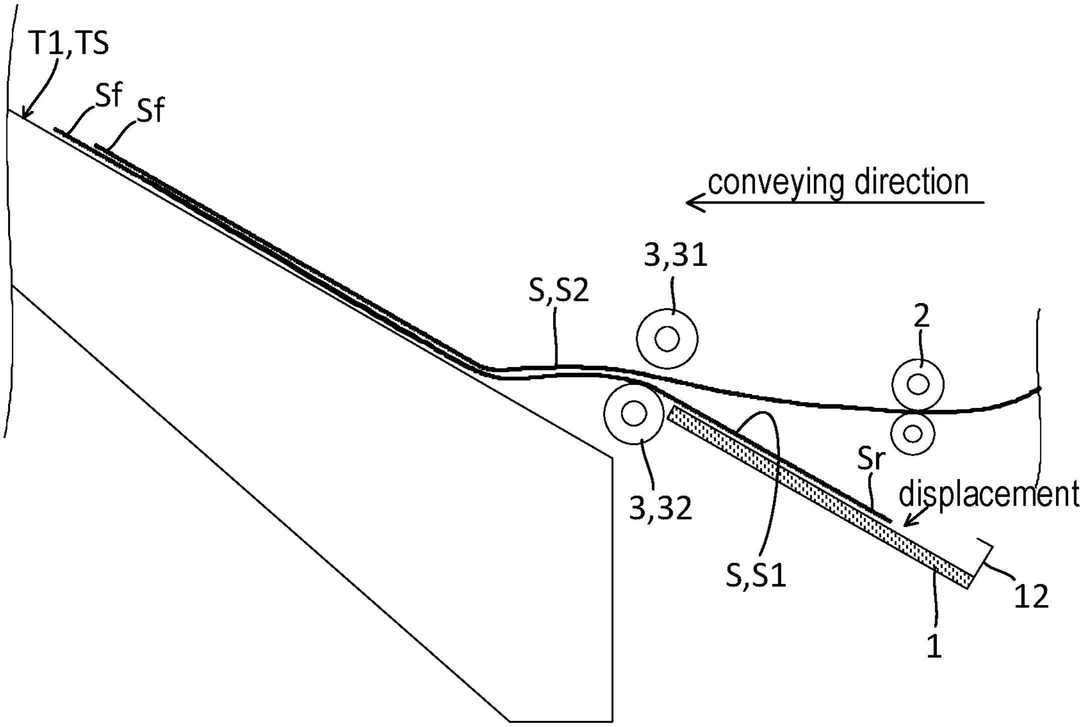
FIG. 10 is a diagram for explaining a disadvantage caused by loading the sheet onto the processing tray.

First, a case where the control of this embodiment is not performed is described. If the control of this embodiment is not performed, disadvantages as illustrated in FIGS. 8 to 10 can occur. Note that in FIGS. 8 to 10, for easy understanding of the drawings, the preceding sheet S1 and the following sheet S2 are shown in a separated manner for convenience sake.

In the state where the preceding sheet S1 is loaded on the processing tray 1, as illustrated in FIG. 8, the front end Sf of the preceding sheet S1 is protruded onto the main tray T1. Further, In this state, the front end Sf of the following sheet S2 enters onto the main tray T1.

After that, the following sheet S2 moves while contacting its front end Sf with the top surface of the preceding sheet S1. Here, as the area of a part Sa of the preceding sheet S1 along the top surface of the main tray T1 is larger, a contact area between the preceding sheet S1 and the following sheet S2 becomes larger. In other words, the conveyance load of the following sheet S2 becomes larger.

In this way, depending on conditions, as illustrated in FIG. 9, the front end Sf of the following sheet S2 hardly move, and the following sheet S2 be buckled on the upstream side in the conveying direction than the front end Sf of the following sheet S2. In this case, the following sheet S2 be jammed.

In addition, as illustrated in FIG. 10, the preceding sheet S1 be pushed out due to the frictional resistance between the preceding sheet S1 and the following sheet S2, and hence the position of the rear end Sr of the preceding sheet S1 be displaced from the reference plate 12. Furthermore, although not illustrated, when the pull-in member 4 pulls in the following sheet S2 onto the processing tray 1, the frictional resistance between the preceding sheet S1 and the following sheet S2 prevent the rear end Sr of the following sheet S2 from reaching the reference plate 12. In these cases, alignment of the sheets S on the processing tray 1 be disturbed.

Therefore, in this embodiment, in order to decrease the contact area between the preceding sheet S1 and the following sheet S2, the position control of the main tray T1 in the up and down direction is performed. When this control is performed, the area of the part Sa of the preceding sheet S1 along the top surface of the main tray T1 can be reduced, and the conveyance load of the following sheet S2 can be reduced.

Specifically, when the sheet S is not loaded onto the processing tray 1 but is discharged onto the main tray T1, the control unit 10 sets the position of the main tray T1 in the up and down direction to the discharge position. In other words, the control unit 10 sets the position of the target surface TS in the up and down direction to the discharge position. For instance, the position of the target surface TS in the up and down direction illustrated in FIGS. 8 to 10 is the discharge position.

Figure 11:
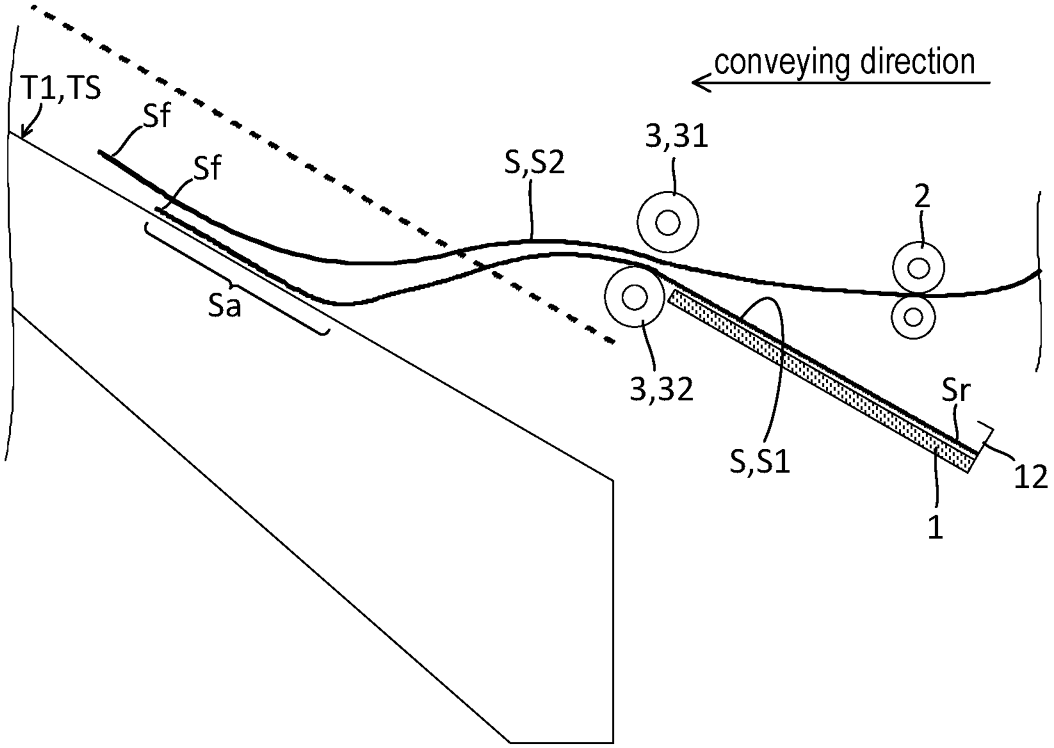
FIG. 11 is a diagram for explaining position control of a main tray in the up and down direction when loading the sheet onto the processing tray, in the sheet post-processing device according to one embodiment.
Figure 12:
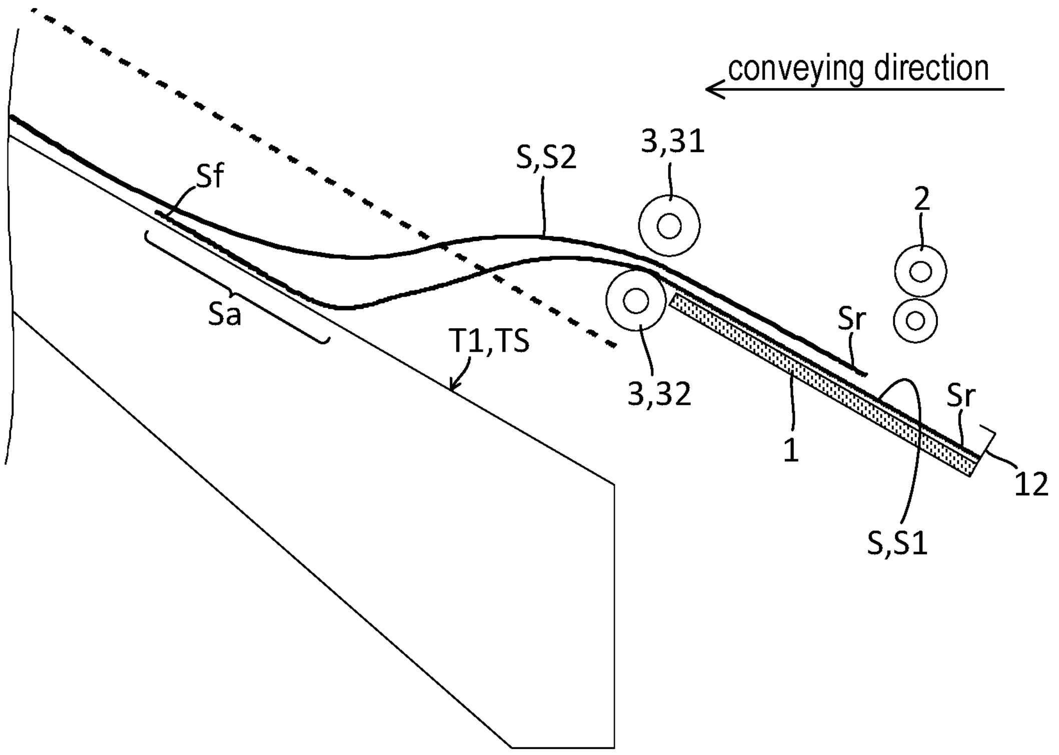
FIG. 12 is a diagram for explaining the position control of the main tray in the up and down direction when loading the sheet onto the processing tray, in the sheet post-processing device according to one embodiment.

On the other hand, as illustrated in FIGS. 11 and 12, when loading the sheet S onto the processing tray 1, the control unit 10 sets the position of the main tray T1 in the up and down direction to a loading position lower than the discharge position. In other words, the control unit 10 sets the position of the target surface TS in the up and down direction to the loading position lower than the discharge position. FIG. 11 is a diagram showing a state before the rear end Sr of the following sheet S2 passes the intermediate roller pair 2, and FIG. 12 is a diagram showing a state after the rear end Sr of the following sheet S2 passes the intermediate roller pair 2 (i.e., when the pull-in member 4 pulls in the following sheet S2 onto the processing tray 1). Note that in FIGS. 11 and 12, the discharge position is shown by a broken line.

In this embodiment, as described above, in the state where the position of the main tray T1 (i.e., the target surface TS) in the up and down direction is maintained at the loading position lower than the discharge position, the loading process of the sheet S onto the processing tray 1 is performed, and hence the contact area between the preceding sheet S1 and the following sheet S2 is decreased. In other words, the part Sa of the preceding sheet S1 along the top surface of the main tray T1 (see FIGS. 11 and 12) is decreased.

In this way, the conveyance load of the following sheet S2 that is being conveyed by the intermediate roller pair 2 can be reduced, and the conveyance load of the following sheet S2 that is being pulled in by the pull-in member 4 can be reduced. In addition, it is possible to prevent the preceding sheet S1 that is already loaded on the processing tray 1 from being pushed out by the following sheet S2. As a result, loading of the sheets S onto the processing tray 1 can be securely performed. Specifically, it is possible to prevent occurrence of disadvantages such as jamming of the following sheet S2, loading failure of the following sheet S2, or positional displacement of the preceding sheet S1.

Note that the conveyance load of the sheet S varies depending on characteristics of the sheet S.

For instance, if the lengths of the sheet S in the conveying direction and in the width direction perpendicular to the conveying direction are large (e.g., if the size of the sheet S is the A3 size), the contact area between the sheets S is large, and the conveyance load of the sheet S is large. Therefore, as the lengths of the sheet S in the conveying direction and in the width direction are larger, the control unit 10 sets the lower position of the target surface TS in the up and down direction (the lower loading position) when loading the sheet S onto the processing tray 1.

In addition, if the sheet S is a paper sheet, fibers of the sheet S tend to align along the direction in which the paper flows in a paper machine. This direction in which fibers align is referred to as a grain direction of the sheet S. If the grain direction of the sheet S is parallel with the width direction (lateral grain direction), the sheet S tends to curl. If the sheet S curls, the contact area between the sheets S increases, and the conveyance load of the sheet S is increased. Therefore, the control unit 10 sets the position of the target surface TS in the up and down direction (the loading position), when loading the sheet S onto the processing tray 1, to be lower in the case where the grain direction of the sheet S is parallel to the width direction, than in the case where the grain direction of the sheet S is perpendicular to the width direction.

In addition, if the sheet S has a lower surface smoothness (i.e., if the sheet S has a rough surface), the frictional resistance between the sheets S is large, and the conveyance load of the sheet S is large. Therefore, as the surface smoothness of the sheet S is lower, the control unit 10 sets the lower position of the target surface TS in the up and down direction (the lower loading position) when loading the sheet S onto the processing tray 1.

In addition, if the image forming apparatus 200 is the inkjet recording apparatus, as the amount of ink used for image formation on the sheet S is more, the sheet S has more moisture. If the sheet S has more moisture, the frictional resistance between the sheets S is larger, and the conveyance load of the sheet S is larger. Therefore, as more ink is used for image formation on the sheet S, the control unit 10 sets the lower position of the target surface TS in the up and down direction (the lower loading position) when loading the sheet S onto the processing tray 1.

Here, the conveyance load of the sheet S varies also depending on thickness of the sheet S or basis weight of the sheet S. For instance, if the basis weight of the sheet S increases, weight of the sheet S increases, and the conveyance load of the sheet S tends to increase. However, there is a case where when the basis weight of the sheet S increases, density of the sheet S increases (the sheet S becomes harder) so that amount of ink penetration is decreased, and hence an increase in the conveyance load of the sheet S is suppressed.

In addition, the conveyance load of the sheet S varies also depending on conveyance speed of the sheet S or conveyance interval of the sheets S. If the conveyance speed of the sheet S is decreased, or if the conveyance interval of the sheets S is increased, the ink ejected onto the sheet S is easily dried, and the frictional resistance between the sheets S is decreased. On the other hand, if the ink ejected onto the sheet S is dried fast, the sheet S tends to curl so that the contact area between the sheets S be increased, and that the conveyance load of the sheet S be increased.

In this way, only the lengths of the sheet S, the grain direction of the sheet S, the surface smoothness of the sheet S, and the amount of ink used for image formation on the sheet S not be sufficient to optimally adjust the position of the target surface TS in the up and down direction (the loading position), when loading the sheet S onto the processing tray 1.

Therefore, in this embodiment, relationships between the optimal position of the target surface TS in the up and down direction when loading the sheet S onto the processing tray 1 (the loading position) and the lengths of the sheet S in the conveying direction and in the width direction, the thickness of the sheet S, the basis weight of the sheet S, the grain direction of the sheet S, the surface smoothness of the sheet S, the amount of ink used for image formation on the sheet S, the conveyance speed of the sheet S, and the conveyance interval of the sheets S are experimentally obtained in advance, and the relationships are made into a table and stored in a storage device of the control unit 10.

For instance, when executing the print job with the stapling process (i.e., the print job in which the sheets S are loaded onto the processing tray 1), the user inputs sheet information about characteristics of the sheet S to be used in the print job this time, to the image forming apparatus 200 via the operation panel OP. The sheet information includes at least one of the lengths of the sheet S in the conveying direction and in the width direction, the thickness of the sheet S, the basis weight of the sheet S, the grain direction of the sheet S, and the surface smoothness of the sheet S. The control unit 10 communicates with the main control unit of the image forming apparatus 200, so as to obtain the sheet information input by the user.

In addition, the main control unit of the image forming apparatus 200 determines the amount of ink to be used for image formation on the sheet S, on the basis of the image data to be printed in the print job. The control unit 10 communicates with the main control unit of the image forming apparatus 200, so as to obtain ink amount information about the amount of ink to be used for image formation on the sheet S. In addition, the control unit 10 communicates with the main control unit of the image forming apparatus

200, so as to obtain conveyance information about the conveyance speed of the sheet S and the conveyance interval of the sheets S.

The control unit 10 obtains the sheet information, the ink amount information, and the conveyance information, as setting information for setting the position of the target surface TS in the up and down direction (the loading position) when loading the sheet S onto the processing tray 1 (corresponding to "predetermined setting information"). Note that among the sets of information about the lengths of the sheet S in the conveying direction and in the width direction, the thickness of the sheet S, the basis weight of the sheet S, the grain direction of the sheet S, the surface smoothness of the sheet S, the amount of ink used for image formation on the sheet S, the conveyance speed of the sheet S, and the conveyance interval of the sheets S, one or more sets of information be used as the setting information. In other words, the setting information includes at least one set of information out of the lengths of the sheet S in the conveying direction and in the width direction, the thickness of the sheet S, the basis weight of the sheet S, the grain direction of the sheet S, the surface smoothness of the sheet S, the amount of ink used for image formation on the sheet S, the conveyance speed of the sheet S, and the conveyance interval of the sheets S.

On the basis of the obtained setting information, the control unit 10 sets the position of the target surface TS in the up and down direction when loading the sheet S onto the processing tray 1 (the loading position). In other words, on the basis of the obtained setting information, as the conveyance load of the sheet S is larger, the control unit 10 sets the lower position of the target surface TS in the up and down direction when loading the sheet S onto the processing tray 1 (the lower loading position). In this structure, without affected by characteristics of the sheet S, the amount of ink used for image formation on the sheet S, the conveyance speed of the sheet S, the conveyance interval of the sheets S, or the like, the sheets S can be securely loaded and aligned on the processing tray 1.

Note that the method of obtaining the sheet information is not particularly limited. Instead of obtaining the sheet information input via the operation panel OP, a media sensor may be used for detecting the sheet information, for example. In this structure, any position on the conveying path of the sheet S may be set as a detection position of the media sensor.

In the case of detecting the thickness of the sheet S, a laser coaxial displacement meter can be used as the media sensor, which detects the thickness by sandwiching the sheet S using two optical sensors.

In the case of detecting the basis weight of the sheet S, a basis weight sensor can be used as the media sensor, which measures the basis weight based on transmittance of light through the sheet S. Note that depending of type of the sheet S, the relationship between the light transmittance and the basis weight varies, and it is necessary to select an optimal basis weight conversion formula for each type of the sheet S. In addition, it is also possible to calculate density ($g/m^3$) of the sheet S by dividing the basis weight ($g/m^2$) by the thickness (m).

In the case of detecting the grain direction of the sheet S, it may be possible to use an image sensor device as the media sensor, to capture a transmission image when LED light is emitted to the backside of the sheet S, and to compare the transmission image with a reference image stored in the control unit 10 in advance, so as to detect the grain direction of the sheet S. Alternatively, it may be possible to use an ultrasonic measuring device as the media sensor, to measure a reflection waveform when an ultrasonic wave is emitted to the sheet S, and to compare the reflection waveform with a reference waveform stored in the control unit 10 in advance, so as to detect the grain direction of the sheet S.

In the case of detecting the surface smoothness of the sheet S, it is possible to use a surface property sensor that detects surface characteristics of the sheet S based on optical reflection characteristics. In general, a sheet S such as plain paper or matte paper having low smoothness (a rough surface sheet S) has reflection characteristics of perfect diffusion. In contrast, a sheet S such as glossy paper having high smoothness (a high glossiness sheet S) has a state in which positive reflection and diffusion are mixed. The surface property sensor detects the surface property of the sheet S using the difference of the reflection characteristics described above.

In addition, the amount of ink on the sheet S can be detected using a moisture meter as the media sensor.

Here, it may be possible that the user (including a maintenance operator) can correct the position of the target surface TS in the up and down direction when loading the sheet S onto the processing tray 1. For instance, the user changes the mode of the image forming apparatus 200 to a maintenance mode. Further, when the image forming apparatus 200 is in the maintenance mode, the user sets correction information and inputs it via the operation panel OP. In other words, the operation panel OP accepts the input of the correction information from the user.

The control unit 10 communicates with the main control unit of the image forming apparatus 200 so as to obtain the correction information. On the basis of the correction information, the control unit 10 corrects the position of the target surface TS in the up and down direction based on the setting information. The correction information may be information indicating a direction and an amount to change the target surface TS. By inputting the correction information, the position of the target surface TS in the up and down direction when loading the sheet S onto the processing tray 1 can be set lower or higher. In this structure, after the sheet post-processing device 100 is shipped, the position of the target surface TS in the up and down direction when loading the sheet S onto the processing tray 1 can be corrected in accordance with the sheet S used in the destination.

<Position Control of Target Surface when Discharging Sheet onto Main Tray>

Figure 13:
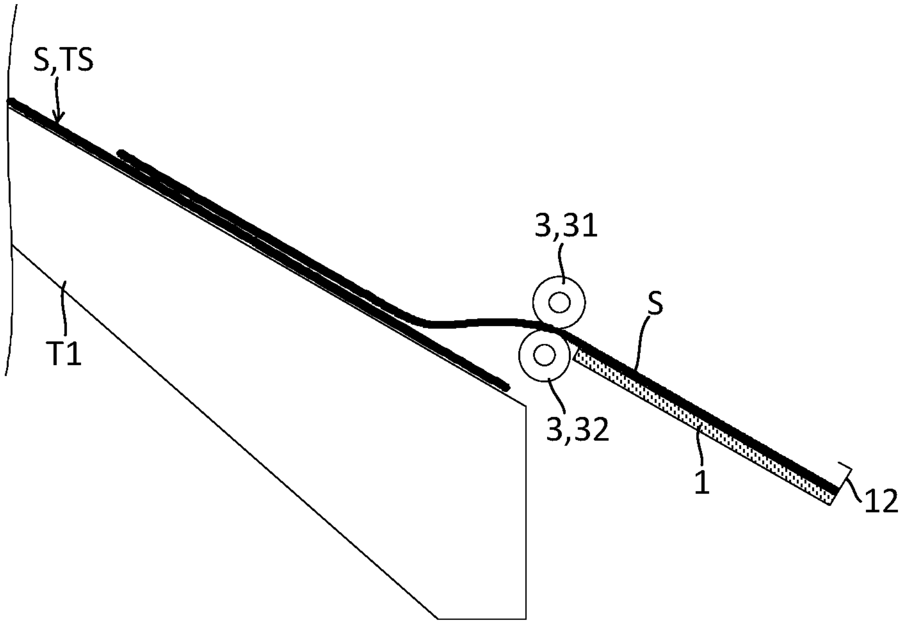
FIG. 13 is a diagram for explaining a discharge process of the sheet onto the main tray in the sheet post-processing device according to one embodiment.
Figure 13:
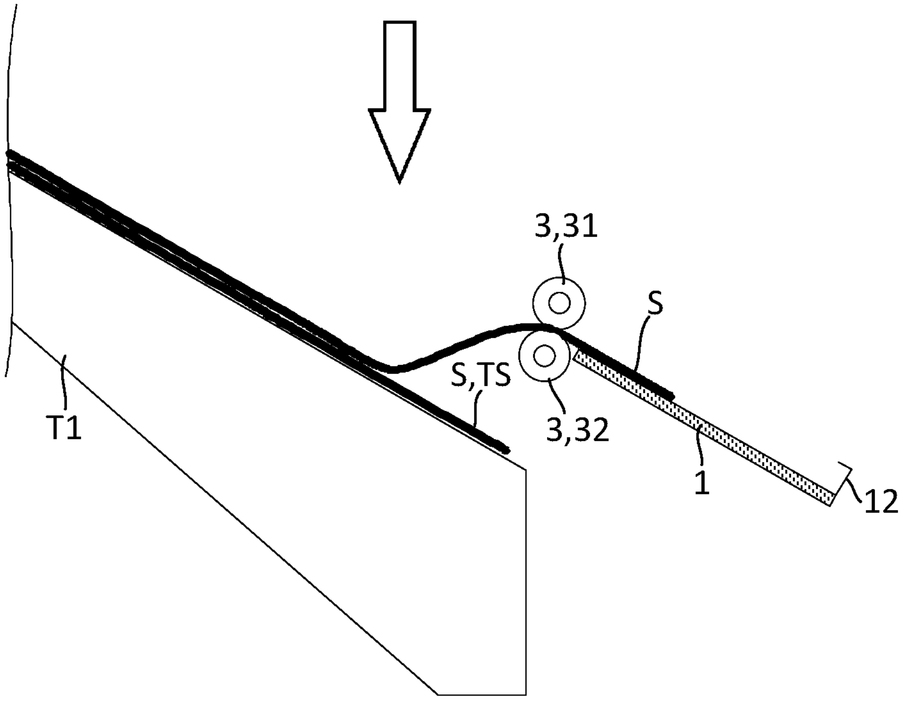

Hereinafter, with reference to FIG. 13, the discharge process of the sheet S from the processing tray 1 onto the main tray T1 is described.

When the number of the sheets S loaded onto the processing tray 1 reaches a set number, the control unit 10 controls the main tray T1 to move upward, and maintains the position of the main tray T1 (i.e., the target surface TS) in the up and down direction at a predetermined position. In addition, the control unit 10 controls the upper roller 31 to move downward so that the discharge roller pair 3 nips the sheet S. The state in this case is illustrated in the upper part of FIG. 13. Note that the predetermined position is the same as the discharge position.

Here, the control unit 10 controls the discharge roller pair 3 to discharge the sheet S while controlling the main tray T1 to move downward from the discharge position. In this way, during the period while the discharge roller pair 3 is discharging the sheet S, the target surface TS moves downward. In other words, during the discharge of the sheet S onto the main tray T1, the state illustrated in the upper part of FIG. 13 is changed to the state illustrated in the lower part of FIG. 13.

In this structure, compared with the case where the sheet S is discharged without moving the main tray T1 downward, it is possible to suppress an increase in the conveyance load of the sheet S that is being discharged. In this way, it is possible to prevent occurrence of discharge failure such as jamming of the sheet S that is being discharged.

The embodiment disclosed in this specification is an example in every aspect and should not be interpreted as a limitation. The scope of the present disclosure is defined not by the above description of the embodiment but by the claims, and should be understood to include all modifications within meaning and scope equivalent to the claims.

What is claimed is:

1. A sheet post-processing device, comprising:

a processing tray disposed inside a device main body, so that a sheet is loaded on the processing tray;

a post-processing section that performs predetermined post-processing on the sheet loaded on the processing tray;

a discharge outlet through which the sheet on the processing tray is discharged;

a discharge tray disposed movably along a side face of the device main body extending downward below the discharge outlet, so that the sheet discharged through the discharge outlet is loaded on the discharge tray;

a discharging member that conveys the sheet on the processing tray toward the discharge outlet, and discharges the sheet onto the discharge tray through the discharge outlet;

a lifting mechanism that drives the discharge tray to move in an up and down direction; and a control unit that controls the movement of the discharge tray in the up and down direction driven by the lifting mechanism;

an intermediate roller pair including a pair of rollers in pressed contact with each other, the intermediate roller pair rotating with the sheet nipped between the pair of rollers to convey the sheet toward the discharge outlet and then make a front end of the sheet protrude above the discharge tray via the discharge outlet; and a pull-in member that, after a rear end of the sheet conveyed by the intermediate roller pair has passed through the intermediate roller pair, switches back the sheet with the front end of the sheet protruding above the discharge tray via the discharge outlet, the pull-in member thereby pulling in the sheet to load the sheet onto the processing tray, wherein when discharging the sheet onto the discharge tray, the control unit sets position of the discharge tray in the up and down direction to a predetermined discharge position, and when loading the sheet onto the processing tray, the control unit sets the position of the discharge tray in the up and down direction to a loading position lower than the discharge position.

2. The sheet post-processing device according to claim 1, further comprising a top surface detection unit that recognizes a top surface of the discharge tray or a top surface of the sheet discharged on the discharge tray as a target surface, and detects position of the target surface in the up and down direction, wherein the control unit sets the discharge position or the loading position on the basis of an output of the top surface detection unit.

3. The sheet post-processing device according to claim 1, wherein the control unit sets the loading position on the basis of at least one of lengths of the sheet in a conveying direction of the sheet and in a width direction perpendicular to the conveying direction, a thickness of the sheet, a basis weight of the sheet, a grain direction of the sheet, and a surface smoothness of the sheet.

4. The sheet post-processing device according to claim 1, wherein the control unit controls the discharging member to discharge the sheet while controlling the discharge tray to move downward from the discharge position.

5. An image forming system comprising:

the sheet post-processing device according to claim 1, and an image forming apparatus configured to form an image on the sheet, wherein the sheet post-processing device performs predetermined post-processing on the sheet after image formation.

6. The image forming system according to claim 5, wherein the image forming apparatus is an inkjet recording apparatus that ejects ink onto the sheet so as to form an image, and the control unit sets the loading position on the basis of an amount of ink to be used for image formation on the sheet.

7. The image forming system according to claim 6, wherein the control unit sets the loading position on the basis of at least one of a conveyance speed of the sheet and a conveyance interval of the sheets.

8. The image forming system according to claim 5, further comprising an input section that accepts an input of correction information, wherein the control unit corrects the loading position on the basis of the correction information.

* * * * *